(12) United States Patent
Tang et al.

(10) Patent No.: US 6,256,320 B1
(45) Date of Patent: Jul. 3, 2001

(54) DUAL CLOCKS FOR NETWORK DEVICE

(75) Inventors: Wen-Tsung Tang, Saratoga; Ruchi Wadhawan, Sunnyvale, both of CA (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/087,104

(22) Filed: May 29, 1998

Related U.S. Application Data

(63) Continuation of application No. 09/071,694, filed on May 1, 1998.

(51) Int. Cl.$^7$ .................................................. H04J 3/02
(52) U.S. Cl. ............................................................ 370/462
(58) Field of Search ................................. 370/462, 276, 370/285, 293, 327, 340, 352, 353, 359, 360, 367, 391, 396, 398, 400, 401, 402, 406, 419, 422, 279, 356, 357, 364, 365

(56) References Cited

U.S. PATENT DOCUMENTS

| H1801 | * | 9/1999 | Browning et al. | 379/9 |
|---|---|---|---|---|
| 5,604,735 | * | 2/1997 | Levinson et al. | 370/360 |
| 5,623,610 | * | 4/1997 | Knoll et al. | 370/445 |
| 5,648,959 | * | 7/1997 | Ilyadis et al. | 710/101 |
| 5,687,356 | * | 11/1997 | Basso et al. | 703/23 |
| 5,812,792 | * | 9/1998 | Haddock et al. | 709/249 |
| 5,838,683 | * | 11/1998 | Corley et al. | 370/408 |
| 6,075,773 | * | 6/2000 | Clark et al. | 370/241 |

OTHER PUBLICATIONS

IEEE Draft P802.3z/D2, "Media Access Control (MAC) Parameters, Physical Layer, Repeater and Management Parameters for 1000 Mb/s Operation", LAN MAN Standards Committee of the IEEE Computer Society, IEEE, New York, Feb. 19, 1997.

\* cited by examiner

*Primary Examiner*—Dang Ton
*Assistant Examiner*—Phirin Sam
(74) *Attorney, Agent, or Firm*—McDonnell Boehnen Hulbert & Berghoff

(57) ABSTRACT

A distributed arbitration scheme for a network. Ports in a network device determine which port in a set of ports may broadcast a packet onto a bus in the network device. A method of transmitting data between a set of ports sharing a bus in hub is described. The set of ports includes a first port, and the method comprises the first port receiving a packet, the first port requesting the bus, and, if another port is requesting the bus, the first port transmitting the packet to the bus if the first port has not transmitted a packet later than the another port requesting the bus. A system using two clocks of different speeds in a network device. The hub has at least a port. The port has an internal data path having a first width. A bus is coupled to the port. The bus has a data path that has a second width. The second width is greater than the first width. The hub includes a first clock that has a first frequency and is coupled to circuitry in the port for clocking internal data transfers. The hub includes a second clock that has a second frequency less than the first frequency, and the second clock is coupled to circuitry in the port for qualifying data transfers with the bus.

45 Claims, 6 Drawing Sheets

DUAL CLOCKS FOR NETWORK DEVICE

CONTINUING APPLICATION DATA

This application is a continuation of United States Patent Application entitled DISTRIBUTED ARBITRATION SCHEME FOR NETWORK DEVICE invented by Wen-Tsung Tang and having application Ser. No. 09/071,694, filed on May 1, 1998, now is pending, and which is incorporated herein by reference in its entirety.

BACKGROUND OF THE INVENTION

1. Field of the Invention

This invention relates to clocks for a network, and in particular to methods and systems for multiple clocks for ports on a hub.

2. Description of Related Art

Computer networks are called upon to handle increasingly higher speeds of data transmission. Computer networks often involve numerous end stations coupled together in a hub for communication with each other. Such hubs may represent a bottleneck for efficiency in transmission between the various end stations or other elements of the network. A hub often includes a number of ports, which are coupled to the end stations or other devices in the computer network. Ports are then coupled to other ports via a bus within the hub. Some hubs used in computer networks are repeating hubs and others are switching hubs.

Within the hub, ports must transmit and receive onto the common bus. Conflicts may occur when the various ports attempt to simultaneously transmit from the same bus. One system for resolving conflicts between entities sharing a common transmission medium is the carrier sensed multiple access with collision detect (CSMA-CD) scheme. Under such a scheme, entities attempting to transmit over the shared medium attempt to transmit over the medium and if a conflict occurs then the entities do not transmit at that time. Such a scheme may involve inefficiencies in the use of the transmission medium. More efficient and robust systems for sharing media such as a bus within a hub are needed.

As computer networks increase in speed, components within network devices may be called upon to operate at higher speeds. Clocks for controlling operation of such high speed components are important. However, physical limitations of a bus may prevent the bus from running at a desired clock speed.

SUMMARY

An embodiment of the invention includes a hub including at least a port, the port having an internal data path having a first width; a bus coupled to the port, the bus having a data path having a second width, wherein the second width is greater than the first width; a first clock having a first frequency, the first clock coupled to circuitry in the port for clocking internal data transfers; and a second clock having a second frequency less than the first frequency, the second clock coupled to circuitry in the port for clocking data transfers with the bus.

According to an aspect of the invention, the second clock comprises the first clock divided. According to another embodiment of the invention, the second clock is phase locked with the first clock. According to an embodiment of the invention, a ratio between the first width and the second width corresponds to a ratio between the second frequency and the first frequency.

According to another embodiment of the invention, a ratio between the first width and the second width equals a ratio between the second frequency and the first frequency. According to one embodiment of the invention, the first width comprises 16 bits and the second width comprises 32 bits. Alternatively, the second width comprises a number in the range of 32 to 128 bits. The first frequency may comprise about 63 MHz and the second frequency about 31 MHz. According to an aspect of the invention, data has a delay from transmission on the bus to receipt at a port of less than a period of the second clock.

According to an aspect of the invention, the second clock has a state during which data transfers with the bus are clocked, the state beginning at a time sufficiently long enough after data is clocked from a source to allow the data to be stable at the port at a leading edge of the first clock during the state. According to another aspect of the invention, the second clock has a state during which data transfers with the bus are clocked, a delay exists from data being clocked from a source to data being received at the port, and the delay is sufficient to allow the data to be stable at the port at leading edge of the first clock during the state. The first clock or second clock or both clocks are coupled other than via the bus to the circuitry in the port for clocking internal data transfers.

An embodiment of the invention includes a full duplex Ethernet hub comprising a plurality of ports coupled to a shared backplane bus, a clock coupled to a port in the plurality of ports, the first clock having a first frequency, a second clock coupled to the port, the second clock having a second frequency, the second frequency lower than the first frequency, and logic to clock data into the port based on a state of the first clock and a state of the second clock.

An aspect of the invention is directed to a method of transferring data in a network device having a bus and at least a circuit coupled to the bus. The method comprises clocking data within the circuit with a first signal having a first frequency, the first signal provided other than via the bus; and clocking data into the circuit with a second signal having a second frequency, the second signal provided other than via the bus. According to one aspect, the data is clocked into the circuit with the first signal and the second signal. According to another aspect, the data is clocked into the circuit with the second leading edge of the first signal after a leading edge of the first signal at which the data was clocked out of a source.

The invention includes a distributed arbitration scheme for an internal bus network device. Ports in a network device determine which port in a set of ports may broadcast a packet onto a bus in the network device. An embodiment of the invention is a method of transmitting data between a set of ports sharing a bus in hub. The set of ports includes a first port, and the method comprises the first port receiving a packet, the first port requesting the bus, and, if another port is requesting the bus, the first port transmitting the packet to the bus if the first port has not transmitted a packet later than the another port requesting the bus.

According to an aspect of the invention, the first port transmits based on port numbers of respective ports requesting the bus. According to another aspect of the invention, the first port does not transmit if another port requesting the bus has a lower port number. According to another aspect of the invention, the first port transmits based on whether a buffer coupled to another port is full.

According to various embodiments of the invention, the hub comprises a fiber module or the hub comprises a 100 base SX module.

An embodiment of the invention includes a method of transmitting data between a set of ports sharing a bus in an Ethernet hub. The set of ports including a first port. The first port enters a first state if the first port has received the packet and the first port wins an arbitration with other ports requesting the bus. The packet is transmitted after the first port has entered the first state. The port exits the first state, and after exiting the first state, enters a wait state and remains in the wait state until no other port is requesting the bus.

An aspect of the invention includes entering a second wait state if the first port does not win the arbitration. A further aspect of the invention includes exiting the second wait state after a particular time interval.

An embodiment of the invention includes an Ethernet hub. The hub includes a plurality of ports coupled to a bus. Respective ports have logic that, if a port has received a packet and the port has not transmitted a packet during the current cycle, causes the port to request the bus and transmit the packet if the port wins an arbitration with other ports in the plurality of ports requesting the bus. According to an aspect of the invention, the current cycle ends when no port is requesting the bus.

According to an aspect of the invention a plurality of buffers is coupled to respective ports, and the hub includes logic to cause the port to not transmit the packet if a buffer among the respective buffers is full.

According to an aspect of the invention, the hub includes respective lines coupled to respective ports and requesting the bus comprises driving a respective line. According to another aspect of the invention, respective ports include logic to detect the states of the lines to determine whether the respective ports win the arbitration.

The plurality of ports comprises 8 ports according to an aspect of the invention, and ports in the plurality of ports comprise application specific integrated circuits (ASICs) according to another aspect of the invention.

DETAILED DESCRIPTION

A detailed description of embodiments of this invention is provided with reference to the figures. The invention includes a hub for use in an Ethernet environment where multiple end stations are coupled to the hub through fiber modules and into ports on the hub. Ports on the hub share a common bus for transmitting with each other. Ports execute a distributed arbitration scheme to determine which port may transmit on the bus at any one point in time. When a port has a packet to broadcast to the other ports on the hub, the port may broadcast the packet, if the port has not broadcast a packet during the current cycle and the port wins an arbitration with other ports on the hub. The arbitration between ports is conducted based on port number, where the port with the lowest port number requesting the bus wins an arbitration. After a port receives a packet from an end station, the port attempts to broadcast the packet to other ports on the hub. Then, after the port has successfully broadcast the packet to other ports on the hub, the other ports receive the packet and forward the packet to their respective end stations. End stations may include, for example, a computer coupled to the hub. The various ports within the hub implement the arbitration scheme. As new ports are added, these new ports automatically implement the arbitration scheme.

Figure 1:
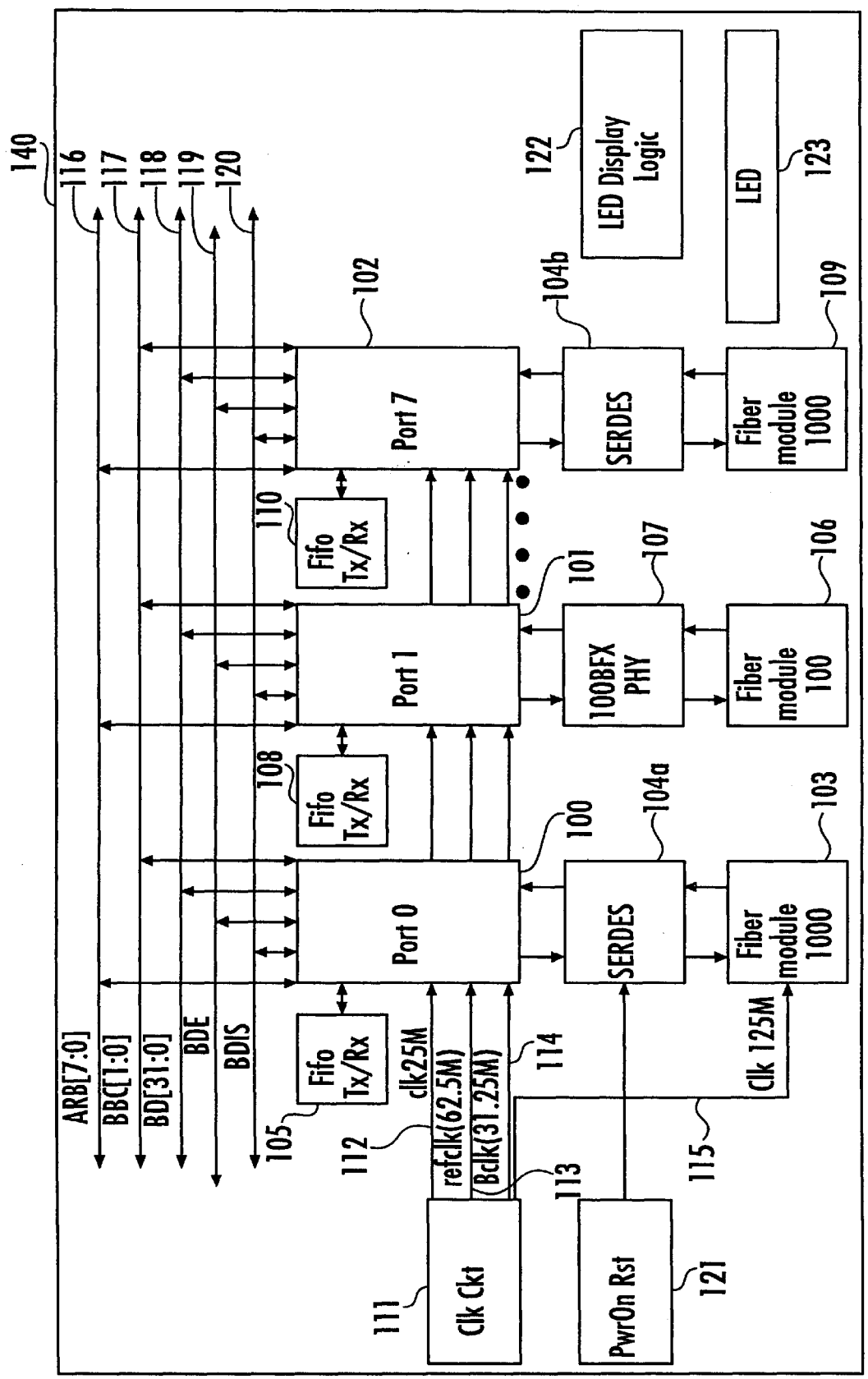
FIG. 1 is a schematic block diagram of a buffered distributor within a hub.

FIG. 1 is a schematic block diagram of a buffered distributor within a hub 140. The hub 140 includes eight ports, port 0 100 and ports 1 101 through port 7 102. Fiber module 1000 103 is coupled to a fiber that is coupled to an end station. Fiber module 1000 103 is coupled to SER/DES 104*a*. SER/DES 104*a* is a serializer deserializer. SER/DES 104*a* is coupled to port 0 100. Port 0 100 is coupled to Fifo Tx/Rx 105. Similarly, other ports are coupled to respective fiber modules and interfaces to fiber modules and to Fifo buffers. For example, port 1 101 is coupled to 100 Base FX PHY 107, which is coupled to fiber module 106, and port 1 101 is coupled to Fifo Tx/Rx 108. Port 7 102 is coupled to SER/DES 104*b*, which is coupled to fiber module 1000 109, and port 7 102 is coupled to Fifo Tx/Rx 110. Clock circuit Clk Ckt 111 is coupled directly to the various ports on the hub 140. For example, Clk 25 m 112, Refclk (62.5 m) 113, and Bclk (31.25 m) 114 are coupled directly to the various ports on the hub 140 including port 0 100, port 1 101, and port 7 102. A power on reset PwrOn Rst 121 is coupled to SER/DES 104. Hub 140 also includes Lead Display Logic 122 and LED 123.

Hub 140 implements 100 Mbit Ethernet in full duplex, or alternatively hub 140 implements Gigibit Ethernet, or a combination of Ethernet protocols. Hub 140 is a Gigabit Ethernet full duplex repeating hub. The hub is a point to point hub, where endstations are coupled to the ports.

In operation, a packet is received by hub 140 on a fiber module, for example, fiber module 103. The packet is converted from serial to parallel through a serializer deserializer, for example, SER/DES 104. The packet is then forwarded to the incoming port, port 100, at which it is then stored in a buffer, Fifo Tx/Rx 105. After a full packet has been received, then the port arbitrates for the bus in order to broadcast the packets to other ports. If the port has not broadcast a packet during the current cycle, then the port may broadcast the packet to the other ports depending on whether the port wins an arbitration with the other ports. In the arbitration, the port having the lowest port number is granted the bus for broadcasting the packet. Then, for example, if port 0 100 wins the arbitration, it can then broadcast the packet to other ports on hub 140, for example to port 1 101 through port 7 102. When these other ports receive the packet, they store the packet in the respective buffers, for example Fifo Tx/Rx 108 through Fifo Tx/Rx 110. The ports receiving the packet then transmit the packet out of hub 140 over their respective fiber modules to their respective devices such as end stations that are coupled into the ports. A power on restart PwrOn Rst circuit 121 restarts elements of hub 140 as hub 140 is restarted. Lead Display Logic 122 and LED 123 provide a display of the status of hub 140 to a user.

The ports on hub 140 are coupled to various lines for signaling and for data transmission. Ports 0 100 through port 7 102 are coupled to the following lines: ARB[7:0] 116, BBC[1:0] 117, BD[31:0] 118, BDE 119, BDIS 120. Arbitration lines ARB[7:0] 116 comprise eight lines each coupled to be driven by a different one of the ports on hub 140 and coupled to be sensed by all ports on hub 140. When a port requests to broadcast a packet, the port drives its own corresponding line of ARB[7:0] 116. For example, port 0 drives ARB[0] when port 0 100 has a packet that it can broadcast on the bus and port 0 100 has not yet broadcast a packet in the current cycle. Ports use ARB[7:0] 116 to determine whether they may broadcast to the bus. By observing the states of the various lines of ARB[7:0] 116, ports determine whether a port with a lower port number is requesting to broadcast to the bus. If a port with a lower port number is requesting to drive the bus, as determined by the state of ARB[7:0] 116, then the port observing the bus will not broadcast to the bus. A backplane byte count is provided by BBC[1:0] 117. BBC[1:0] 117 indicates which of the last four bytes of a broadcast transmission on the bus are valid. For example, the following are values of BBC[1:0] 117 and their corresponding numbers of bytes valid: 1=1 byte, 2=2 bytes, 3=3 bytes, and 0=4 bytes valid. Ports 0 through 7 are implemented as ASICs.

Backplane data, BD[31-0] 118 comprise 32 lines of data. After a port arbitrates for this data bus it then broadcasts a packet over this data bus to other ports in hub 140. A backplane data enable signal BDE 119 is a 1 bit signal that envelopes a frame that is transmitted over the bus, from the Ethernet preamble to the last CRC byte in its high state. Then, in its low state, the BDE signal allows one cycle for the bus to settle down before the respective ports again try to arbitrate for the bus. A bidirectional signal, BDIS 120 may be driven by any port. BDIS indicates that other ports should not arbitrate and that the bus cannot be allocated to any of the ports because one of the ports has a Fifo that is full. Thus when BDIS is activated it indicates that a port which would otherwise try to broadcast to the bus should hold the data in its local memory instead of broadcasting onto the bus.

Figure 2:
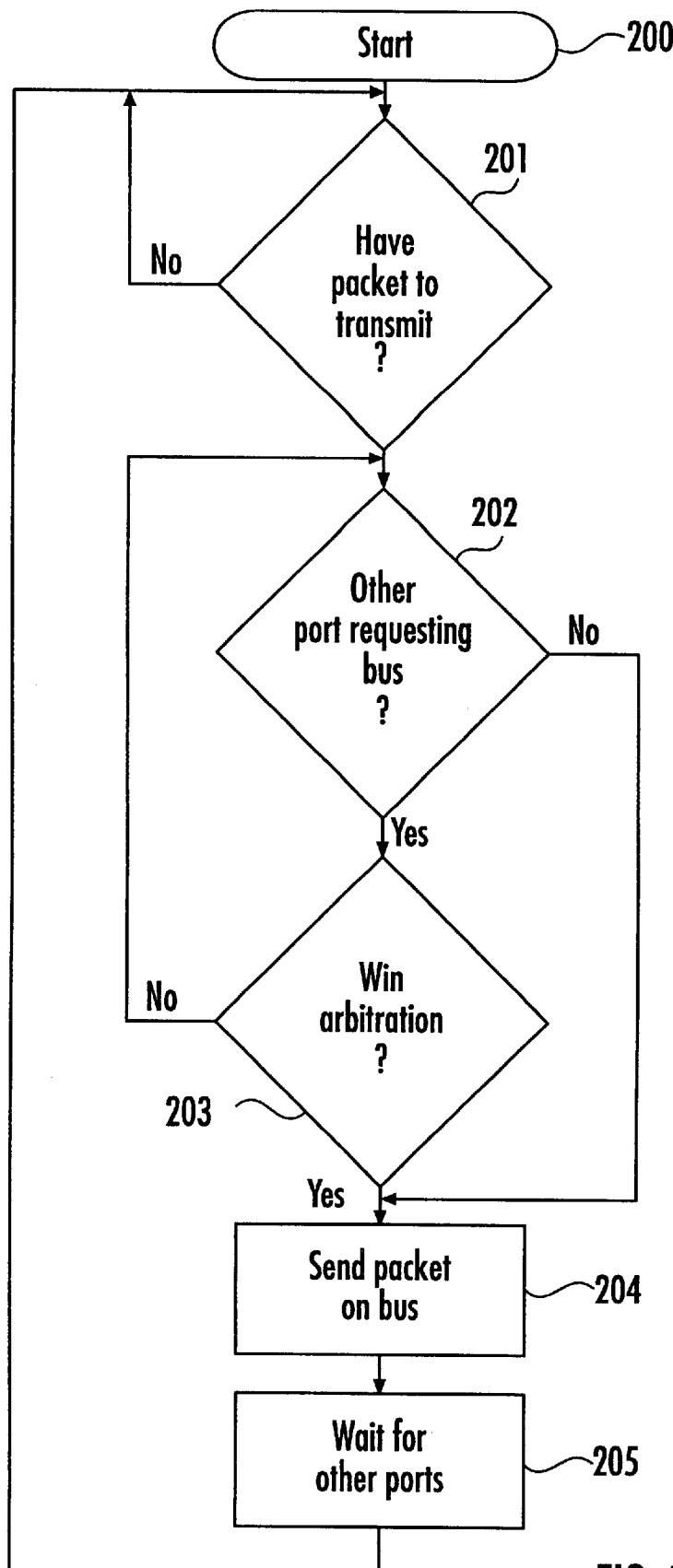
FIG. 2 is a flow chart of arbitration between ports within a hub.

FIG. 2 is a flow chart of arbitration between ports within a hub. FIG. 2 begins with start block 200. This figure shows a single port determining whether to broadcast a packet onto a bus in a hub. First, the port determines whether it has a packet to transmit (block 201). If there is no packet to transmit, then continue to loop at block 201. Next, determine whether another port is requesting the bus (block 202). If another port is not requesting a bus, then send the packet on the bus so as to broadcast it to other ports (block 204). Otherwise, if another port is requesting the bus, first determine whether the current port wins in arbitration with any other ports requesting the bus (block 203). If port does not win the arbitration, then return to block 202 to determine whether another port is requesting the bus. If the current port wins the arbitration (block 203), then send the packet on the bus to broadcast the packet to other ports in the hub (block 204). Then, wait for other ports to broadcast packets onto the bus (block 205). Next, return to determining whether the current port has a packet to transmit on the bus (block 201). Accordingly, this process helps to achieve a short term fairness between ports that have packets to broadcast onto the bus by allowing a port to transmit a packet onto the bus and then requiring the port to wait for other ports that also have packets to transmit before the current port transmits another packet onto the bus. In an alternative embodiment of the invention, a port transmits a set of packets when it wins the arbitration with other ports. The size of the set is determined by an optimal time for other ports to wait to transmit their respective packets.

Figure 3:
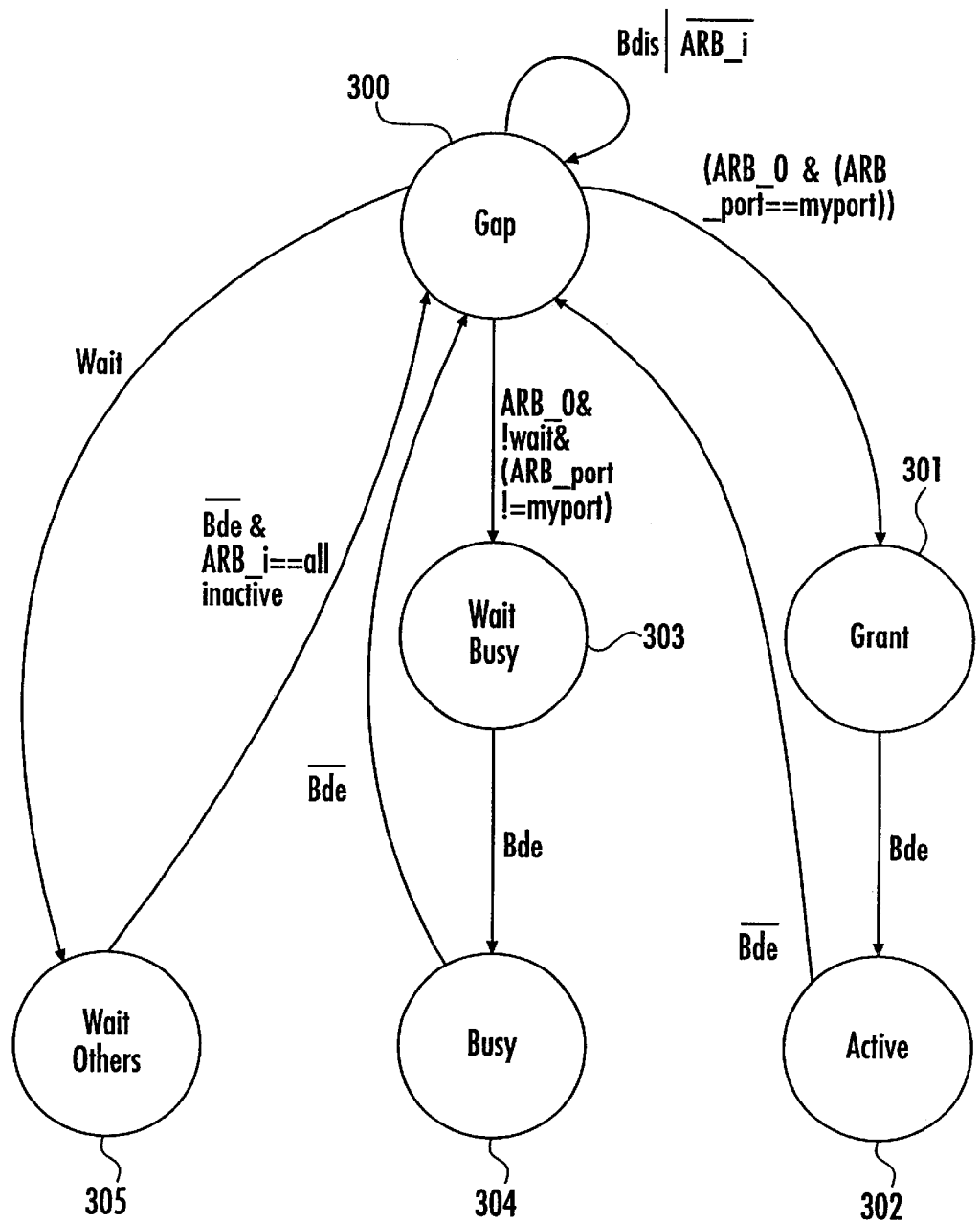
FIG. 3 is a state diagram of arbitration between ports within a hub.

FIG. 3 is a state diagram of arbitration between ports within a hub. The state diagram is from the perspective of a single port and illustrates arbitration between the single port, port 0, and other ports on the hub. Each port in the hub implements this arbitration scheme.

In gap 300 port 0 is not transmitting. A transition to from gap 300 grant 301 occurs when port 0 is driving its line of the arbitration signal (ARB-O) and when the arbitration determines that port 0 may be granted the bus. As shown, the fact that port 0 may obtain the bus is determined by ARB_port==my port. By observing all lines of ARB[7:0] a port can determine whether it has the lowest port number of ports requesting the bus. If so, then the port wins the arbitration with other ports. Within state grant 301 no packet is broadcast over the bus. From grant 301 a transition is made to active 302 when BDE is high. In active 302 the packet may be transmitted from port 0 to broadcast to other ports on the hub. A transition from active 302 to gap 300 is made upon the low state of BDE.

If BDIS is high, that indicates that at least one port has its buffer full and that, therefore, other ports should not transmit onto the bus. Thus, upon a high state of BDIS, the port remains in gap state 300. Also, if no port is requesting the bus (as indicated by ARB_i low), then the port remains in gap 300.

A transition is made from gap 300 to wait busy 303 when port 0 requests the bus and does not win the arbitration with other ports and has not already transmitted a packet during the current cycle. !Wait indicates that port 0 has not yet transmitted a packet during a current cycle. From wait busy 303 a transition is made to busy 304 upon a high state of BDE. From busy 304 a transition is made to gap 300 upon low state of BDE. Accordingly, when port 0 requests to transmit to other ports on the bus, but it does not win the arbitration with other ports, port 0.

After port 0 has transmitted on the bus, "wait" is true and a transition is made from gap 300 to wait others 305. During wait others 305, port 0 does not transmit onto bus and waits for other ports requesting to transmit on the bus to first transmit before port 0 again attempts to transmit onto the bus. A transition is made from wait others 305 to gap 300 upon the low state of BDE and when all other ARB signals are inactive. This indicates that the current cycle is over and ports may again attempt to transmit a packet on the bus even if they have transmitted a packet in the previous cycle.

Figure 4:
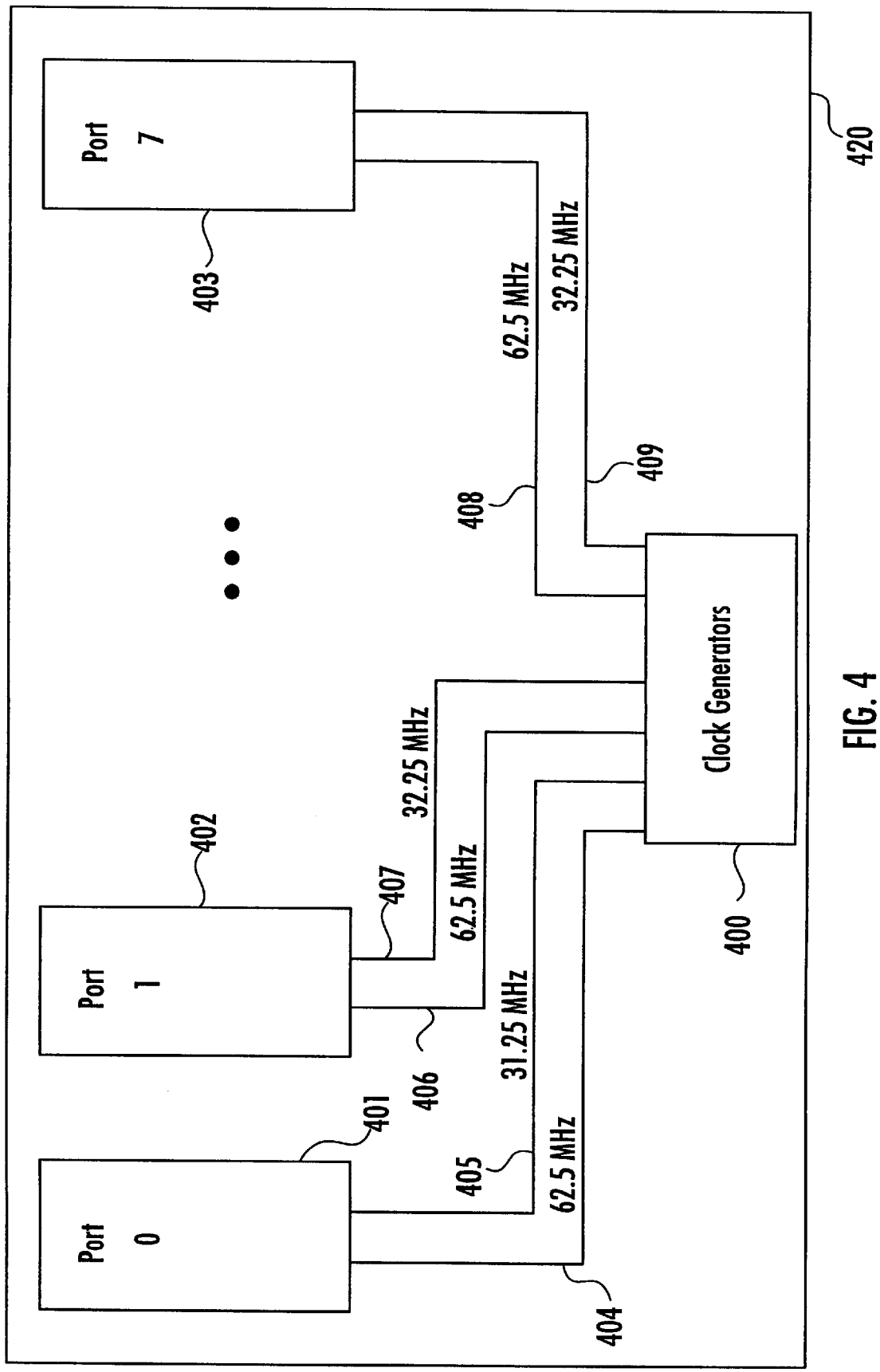
FIG. 4 is a schematic block diagram of ports within a hub and clock generators.

FIG. 4 is a schematic block diagram of ports within a hub and clock generators. Central clock are used on hub 140 and are separately coupled to the ports, port 0 through 7 on the hub 420. Clock generators 400 provide separate clock signals to the respective ports on hub 420. These clocks may be generated as completely separate clocks that are phase locked looped with each other. Alternatively a single clock, for example, 125 MHz, is generated and is divided to provide the 62.5 MHz clock signals. These signals may also be phased locked with each other. A separate 62.5 MHz clock 404 is couple from clock generator 400 directly to port 0 401 via a route other than via back plane of bus 420. A separate 31.25 MHz clock 405 is coupled directly from the clock generators 400 to port 0 401. Similarly, a separate 62.5 MHz clock 406 is coupled from clock generators 400 to port 1 402 as well as a 31.25 MHz clock 407. Also, separate clocks are coupled to other ports on hub 420 including a 62.5 MHz clock 408 and a 31.25 MHz clock 409 which are separately coupled from clock generators 400 to port 7 403. Such an architecture provides a shorter path from clock generators 400 to the various ports than would be otherwise provided were the clock generators signals to be provided via a bus. Also, this architecture helps to provide a lower load on clock generators and thus less skew between clock signals to various ports than may otherwise be provided in some other configurations. The speed of transmission of data into hub 420 may be approximately 2 to 3 gigabits per second, for example 2 gigabits per second, 2.5 gigabits per second, or 3 gigabits per second or other values in the range of 2 to 3 gigabits per second. Alternatively the speed may be around 1 gigabit per second, or a value in the range of 1 gigabit to 2 gigabits per second.

The dual clock architecture shown provides a higher speed clock, the 62.5 MHz clock for internal clocking in the various ports, where the data rate is high and the data path is narrower. For example, the data path within a port such as port 0 401, is 16 bits wide. The data path on the bus coupling various ports together is 32 bits. Thus, while data is clocked at the 62.5 Hz clock internally in a port, it is clocked at a slower speed, 31.25 MHz externally to the ports, on the bus between the ports. Data is clocked into ports through a combination of the faster, 62.5 Hz clock, and the slower, 31.25 MHz clock. A leading edge of the faster clock, the 62.5 MHz clock, is used to clock in data, and is done so during the second cycle of the slower, 31.25 MHz clock, in order to provide time for data on the bus to settle.

By selecting the width of the data bus, e.g., to a value other than 32 bits, different data rates may be achieved. Separately or in conjunction with varying the width of the data bus the clock rate of either of the two clocks may be changed. For example, a slower clock rate may be used in a system with a greater width of the data bus to achieve the same data rate as in a system with a narrower data bus width and faster clock. As described above in the example with a slow clock for bus transfers and a faster clock for internal transfers, if a fast clock rate is used internally within a port, a slower clock may be used in conjunction with the fast clock to clock data on a bus that has a width greater than the internal data transmission channel in the port.

Figure 5:
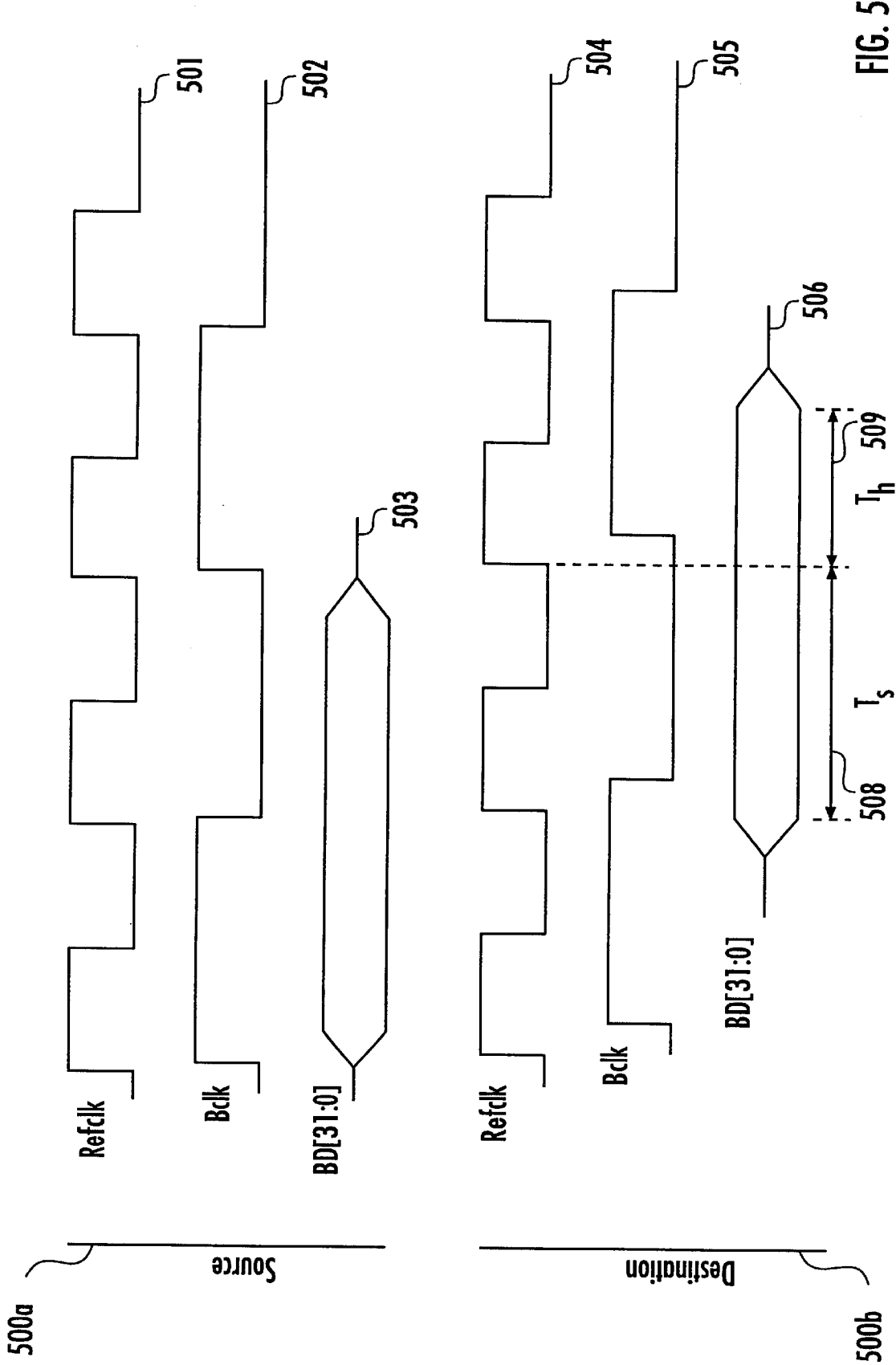
FIG. 5 shows timing diagrams for clocks and data transmission within a hub.

FIG. 5 shows timing diagrams for clocks and data transmission within a hub. FIG. 5 includes signals on a source 500a and signals on a destination 500b. Source signals 500a are signals received or transmitted at or from a port that is transmitting on the bus. Refclk 501 and Bclk 502 are received by the port that is transmitting onto the bus. Data, BD[31:0] 503 is transmitted by source and is clocked out Bclk 502 is low as BD 503 is clocked out of the source. Destination signals 500b represent signals that are received by the destination port including Refclk 504, Bclk 505, and BD[31:0] 506. Some skew may exist between Refclk 501 on the source and Refclk 504 on the destination. Similarly, some skew may exist between Bclk 502 and Bclk 505 on the destination. Skew exists between data transmitted from source 500a, BD[(31:0] 503 and data transmitted to destination 500b, BD[31:0] 506. Data is clocked at the destination based on a leading edge of Refclk 504 and low state of Bclk 505. This allows the time Ts 508 for the data to settle since the data was clocked out from the source by a leading edge two cycles ago. Thus, relying on the low state of Bclk 505 allows more time for the data to settle than would be possible if an earlier leading edge of Refclk 504 were used to clock in the data. A hold time Th 509 between the time that the data is clocked into the destination and the time at which data is no longer stable is provided as shown. Th results from the skew between the time BD 503 is clocked out of the source to the time BD 506 is received at the source.

A skew between any two versions of Refclk, e.g., Refclk 501 and Refclk 504, within hub 420 is less than one nanosecond. Alternatively, in another embodiment of the invention, a skew of less than 500 picoseconds exists between any two edges of the Refclk within hub 420. A skew between Refclk 501 and Bckl 505 is less than one nanosecond. Alternatively, in another embodiment of the invention, a skew of less than 500 picoseconds exists between Refclk 501 and Bckl 505.

A skew from the leading edge of Refclk 501 at which BD 503 is clocked from source 500a to the low state of Bclk 505 is short enough to allow for BD 506 to be clocked in at destination 500b at the leading edge of Refclk 504. A delay from the leading edge of Refclk 501 at which BD 503 is clocked from source 500a to the low state of Bclk 505 is long enough to allow BD 506 to settle when it is clocked in at a combination of a leading edge of Refclk 504 and a low state of Bckl 505. A skew exists between Refclk 504 and Bclk 505 such that Bclk is low for the second leading edge of Refclk 504 after data BD is clocked from source 500a. A skew from Refclk 501 to Refclk 504 is shorter than a skew between BD 503 and BD 506.

Skew between clock signals and other clock signals are sufficient to provide sufficient hold time for transmission to the nearest port (e.g., a transmission from port 0 to port 1) and to provide sufficient setup time for transmission to the farthest port (e.g., a transmission from port 0 to port 7 in an 8 port system).

Figure 6:
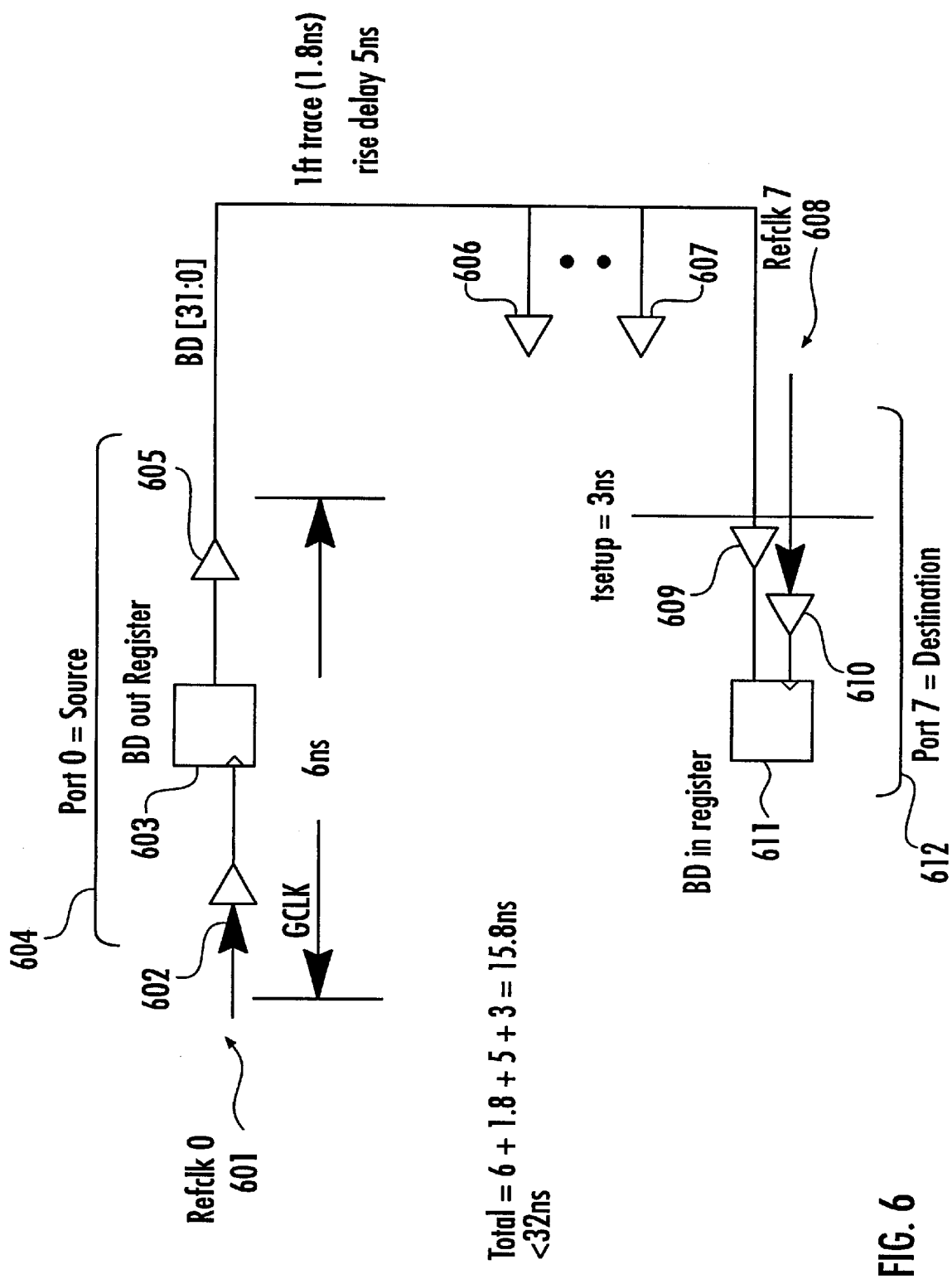
FIG. 6 shows a backplane timing path.

FIG. 6 shows a backplane timing path. Port 0 604, the source of a data transmission in this example, receives a clock signal from Refclk 0 601. The clock signal passes through buffer 602 and into BD out Register 603. Data signal BD[31:0] is provided by BD out Register 603 through buffer 605. Buffers 606, 607, and 609 provide input to various ports including port 7 612. Delay includes a delay from the clock signal of Refclk 0 601 to output of data (6 ns), the delay of a 1 foot trace (1.8 ns), and a rise delay (5 ns).

The foregoing description of embodiments of the invention has been presented for purposes of illustration and description. It is not intended to be exhaustive or to limit the invention to the precise forms disclosed. It is intended that the scope of the invention be defined by the following claims and their equivalents.

What is claimed is:

1. A hub comprising:
   at least a port, the port having an internal data path having a first width;
   a bus coupled to the port, the bus having a data path having a second width, wherein the second width is greater than the first width;
   a first clock having a first frequency, the first clock coupled to circuitry in the port for clocking internal data transfers; and
   a second clock having a second frequency less than the first frequency and at least 30 MHz, a ratio between the second frequency and the first frequency being equal to a ratio between the first width and the second width, the second clock coupled to circuitry in the port for controlling timing of data transfers with the bus.

2. The hub of claim 1, the second clock comprising the first clock divided.

3. The hub of claim 1, the second clock phase locked with the first clock.

4. The hub of claim 1, the first width comprising 16 bits.

5. The hub of claim 1, the second width comprising 32 bits.

6. The hub of claim 1, the second width comprising a number in the range of 32 to 128 bits.

7. The hub of claim 1, the first frequency comprising about 63 MHz.

8. The hub of claim 1, the second frequency comprising about 31 MHz.

9. The hub of claim 1, the second frequency comprising a number in the range of 30 to 70 MHz.

10. The hub of claim 1, the hub transmitting data greater than 1 Gigabits per second.

11. The hub of claim 1, the hub transmitting data greater than 2 Gigabits per second.

12. The hub of claim 1, the hub transmitting data less than 3 Gigabits per second.

13. The hub of claim 1, the hub transmitting data greater than 2 Gigabits per second and less than 3 Gigabits per second.

14. The hub of claim 1, including a plurality of ports coupled to the first clock and the second clock, a skew between the first clock received at a first port in the plurality of ports and the first clock received at any other port in the plurality of ports comprising less than one nanosecond.

15. The hub of claim 1, including a plurality of ports coupled to the first clock and the second clock, a skew between the first clock received at a first port in the plurality of ports and the first clock received at any other port in the plurality of ports comprising less than 500 picoseconds.

16. The hub of claim 1, including a plurality of ports coupled to the first clock and the second clock, a skew between the second clock received at a first port in the plurality of ports and the second clock received at any other port in the plurality of ports comprising less than one nanosecond.

17. The hub of claim 1, including a plurality of ports coupled to the first clock and the second clock, a skew between the second clock received at a first port in the plurality of ports and the second clock received at any other port in the plurality of ports comprising less than 500 picoseconds.

18. The hub of claim 1, data having a delay from transmission on the bus to receipt at a port of less than a period of the second clock.

19. The hub of claim 1, wherein the first clock is coupled to the circuitry in the port for clocking data transfers with the bus, for clocking data transfers with the bus in conjunction with the second clock.

20. The hub of claim 1, wherein the second clock has a state during which data transfers from the bus to the port are clocked, the state beginning at a time sufficiently long enough after data is clocked from a source to allow the data to be stable at the port at a leading edge of the first clock during the state.

21. The hub of claim 1, wherein data transfers from a source to the bus are clocked during a first state of the second clock and data transfers from the bus to the port are clocked during reoccurrence of the first state after a second state.

22. The hub of claim 21, wherein the first state corresponds to a low level of the second clock and the second state corresponds to a high level of the second clock.

23. The hub of claim 1, wherein the second clock has a state during which data transfers from the bus to the port are clocked, a delay exists from data being clocked from a source to data being received at the port, and the delay is sufficient to allow the data to be stable at the port at leading edge of the first clock during the state.

24. The hub of claim 1, the first clock coupled other than via the bus to the circuitry in the port for clocking internal data transfers.

25. The hub of claim 1, the second clock coupled other than via the bus to the circuitry for clocking data transfers with the bus.

26. A full duplex Ethernet hub comprising:
a plurality of ports coupled to a bus, the ports and bus each having a data path having a data a first clock coupled to a port in the plurality of ports, the first clock having a first frequency;

a second clock coupled to the port, the second clock having a second frequency, the second frequency being lower than the first frequency and at least 30 MHz, a ratio between the second frequency and the first frequency being equal to a ratio between the data width of the ports and the data width of the bus; and logic to clock data into the port based on a state of the first clock and a state of the second clock.

27. The Ethernet hub of claim 26, including logic to clock data out of a second port in the plurality of ports based on the first clock and the second clock.

28. The Ethernet hub of claim 26 the second clock comprising the first clock divided.

29. The Ethernet hub of claim 26 the second clock phase locked with the first clock.

30. The Ethernet hub of claim 26 the first frequency comprising about 63 MHz and the second frequency comprising about 31 MHz.

31. The Ethernet hub of claim 26, the hub transmitting data greater than 2 Gigabits per second and less than 3 Gigabits per second.

32. The Ethernet hub of claim 26, the bus having a delay from transmission on the bus to receipt at a port of less than a period of the second clock.

33. The Ethernet hub of claim 26, comprising a first plurality of clocks including the first clock, clocks in the first plurality of clocks coupled to circuitry in respective ports for clocking internal data transfers in the respective ports.

34. The Ethernet hub of claim 33, clocks in the first plurality of clocks phase locked with each other.

35. The Ethernet hub of claim 33, comprising a second plurality of clocks including the second clock, clocks in the second plurality of clocks coupled to circuitry in respective ports for clocking data transfers with the bus.

36. The Ethernet hub of claim 35, clocks in the second plurality of clocks phase locked with each other.

37. The Ethernet hub of claim 26, ports in the plurality of ports coupled to the first clock and the second clock, a skew between the first clock received at a first port in the plurality of ports and the first clock received at any other port in the plurality of ports comprising less than one nanosecond.

38. The Ethernet hub of claim 26, ports in the plurality of ports coupled to the first clock and the second clock, a skew between the first clock received at a first port in the plurality of ports and the first clock received at any other port in the plurality of ports comprising less than 500 picoseconds.

39. The Ethernet hub of claim 26, ports in the plurality of ports coupled to the first clock and the second clock, a skew between the second clock received at a first port in the plurality of ports and the second clock received at any other port in the plurality of ports comprising less than one nanosecond.

40. The Ethernet hub of claim 26, ports in the plurality of ports coupled to the first clock and the second clock, a skew between the second clock received at a first port in the plurality of ports and the second clock received at any other port in the plurality of ports comprising less than 500 picoseconds.

41. A method of transferring data in a network device having a bus and at least a circuit coupled to the bus, the method comprising:
clocking data within the circuit with a first signal having a first frequency, the first signal provided other than via the bus; and clocking data into the circuit with a second signal having a second frequency, the second signal provided other than via the bus;

wherein the second frequency being at least 30 MHz and a ratio between the second frequency and the first frequency being equal to a ratio between a data width of a device from which the data is transmitted and a data width of the bus.

42. The method of claim 41, the method comprising clocking the data into the circuit with the first signal and the second signal.

43. The method of claim 41, the method comprising clocking the data into the circuit with the second leading edge of the first signal after a leading edge of the first signal at which the data was clocked out of a source.

44. The method of claim 41, the method comprising clocking the data into the circuit with the leading edge of the first signal and a second half of a cycle of the second signal.

45. The method of claim 41, the method comprising clocking data from a second circuit onto the bus with the first signal and the second signal.

* * * * *